United States Patent [19]
Machida et al.

[11] Patent Number: 5,621,620
[45] Date of Patent: Apr. 15, 1997

[54] CONVERTER

[75] Inventors: Haruhiko Machida, Tokyo; Shinichi Tasaki, Saitama, both of Japan

[73] Assignee: Kabushiki Kaisha Samy, Osaka, Japan

[21] Appl. No.: 526,963

[22] Filed: Sep. 12, 1995

[30] Foreign Application Priority Data

Dec. 9, 1994 [JP] Japan .................................. 6-306601

[51] Int. Cl.⁶ .................................................. H02M 3/337
[52] U.S. Cl. .................................................. 363/16; 363/22
[58] Field of Search .................................. 363/18, 19, 89, 363/97, 124, 131, 22–25, 133; 323/266, 273–278, 907

[56] References Cited

U.S. PATENT DOCUMENTS 5,070,439  12/1991  Remson ..................... 363/22

Primary Examiner—Aditya Krishnan

[57] ABSTRACT

A converter for raising a weak input DC voltage of 0.3 volts or less to an output voltage has a blocking oscillator and a field-effect transistor included in the oscillator. The transistor having a base earthed is of the enhancement type activated by a gate-source voltage equal to or lower than the input, and the oscillator is activated responding to the gate-source voltage, so that pulses are generated as the output. Typically, the oscillator is composed of a resistor and a condenser connected in series through a lead and between an earth and an input line, a transformer whose secondary winding is connected to transistor's gate and the lead, with a primary winding being connected to the input line and the transistor's drain, and a diode earthed and having a cathode connected to the gate. An electromotive force induced through the secondary winding when the transistor is inactivated has positive and negative poles directed to the condenser and the gate, respectively.

13 Claims, 3 Drawing Sheets

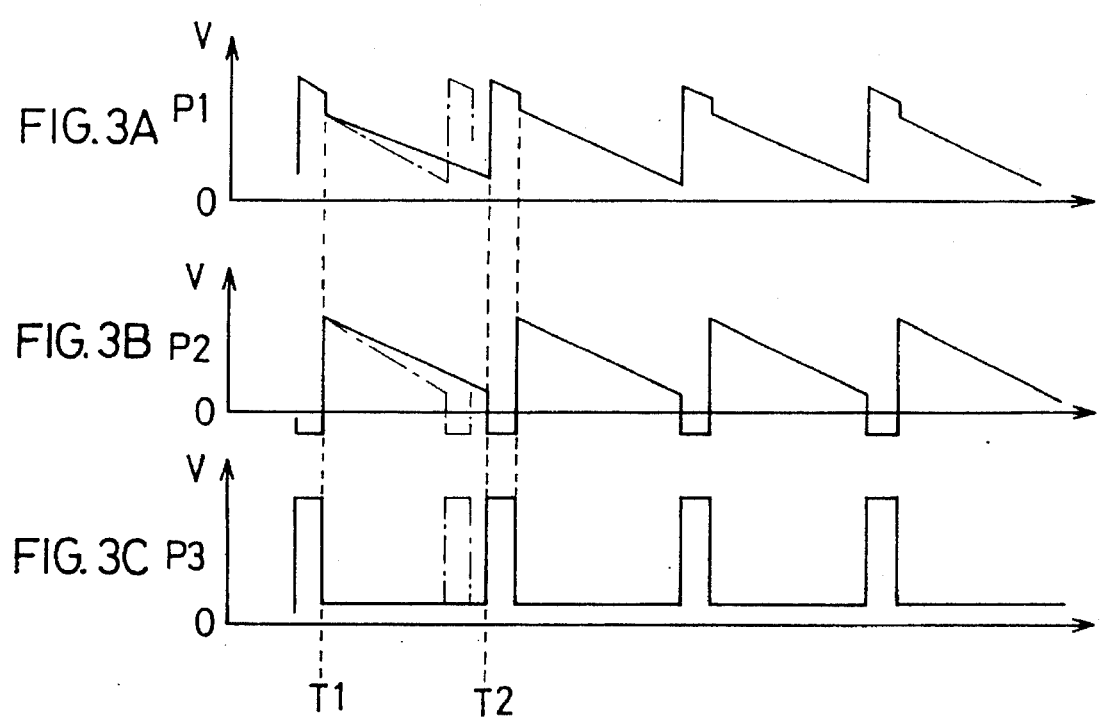
FIG. 3A P1
FIG. 3B P2
FIG. 3C P3
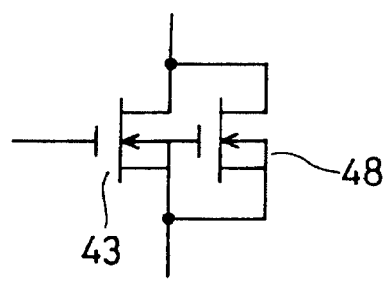
FIG. 4

CONVERTER

BACKGROUND OF THE INVENTION

The present invention relates to a DC-to-DC converter for converting a DC input into a DC output of a voltage different from that of the input, and more particularly relates to a DC-to-DC converter adapted to convert a weak input of 0.3 V or less into an intensive output of a raised voltage.

A variety of solar batteries and thermal batteries are now available as the power source for electric instruments or apparatuses. Each of these batteries includes a generating device in which an electromotive force will be produced when irradiated with light or when heated. In order to amplify a very weak voltage of such an electromotive force, two or more generating devices are connected one to another in series, or alternatively they are made larger in size. An amplified output from the generating devices will further be intensified in voltage, using a converter if necessary.

The series connection of generating devices to form an array thereof is however somewhat disadvantageous in that even if only one or some of them is or are not irradiated with light or comes or come out of order, they would fail as a whole to generate an output at a desired level of voltage. On the other hand, an electric circuit or the like in which the large-sized generating device is incorporated as a power source would be rendered larger in size and more expensive.

OBJECTS AND SUMMARY OF THE INVENTION

An object of the present invention is therefore to provide a converter that can directly amplify a weak DC voltage.

Another object of the invention is to offer a converter that can produce an amplified output voltage such that its generating device or devices need neither be connected in series nor be rendered larger in size.

To accomplish these objects, a converter proposed herein comprises a field-effect transistor of the enhancement type, having a gate and a source and incorporated in a blocking oscillator, wherein the transistor can be energized at an activating voltage charged between the gate and the source even if the activating voltage is equal to or lower than the weak DC input voltage, and wherein the oscillator generates pulses in response to the weak DC voltage charged between the gate and the source of the field-effect transistor such that the pulses are of a raised voltage higher than the DC input voltage.

The blocking oscillator may preferably comprise a resistor and a condenser connected thereto in series and between an earth and an input line for carrying the weak DC input. The oscillator further comprises the field-effect transistor having the source earthed, and a transformer whose secondary winding is connected to and disposed between the field-effect transistor's gate and a conductive line connecting the resistor to the condenser, with a primary winding of the transformer being connected to the input line and the field-effect transistor's drain. The blocking oscillator still further comprises a diode connected to and interposed between the earth and the field-effect transistor's gate facing a cathode of the diode, so that an electromotive force is induced through the secondary winding when the transistor is in a cutoff state, wherein the positive pole of the electromotive force is directed to the condenser, with the negative pole being directed to the transistor's gate. An appropriate means for variably setting a time constant is preferably incorporated in the blocking oscillator for the resistor and condenser thereof.

A smoothing circuit may be combined with the output end of the blocking oscillator, which circuit may in turn be accompanied by a stabilizing circuit. The latter circuit is designed to automatically control the time constant of said resistor and condenser and to thereby keep constant the output from the smoothing circuit.

Thus, the field-effect transistor of the enhancement type incorporated in the blocking oscillator can be energized with an activating input voltage, even if this voltage charged between the gate and the source is equal to or lower than a weak DC voltage of 0.3 volts or less. The output pulses generated by the oscillator are of a raised voltage much higher than the input voltage activating the oscillator. Therefore, such a converter can be used as a power source for rechargeable batteries or for drive circuits in various electric controllers.

Other objects and features of the present invention will become apparent from the description given below.

BRIEF DESCRIPTION OF THE DRAWINGS

FIG. 3A is a time chart showing the waveform observed at one point P1 in the circuit;

FIG. 3B is a time chart likewise showing the waveform observed at a further point P2 in the circuit;

FIG. 3C is similarly a time chart showing the waveform observed at a still further point P3 in the circuit; and FIG. 4 is a diagram showing in a modified state the FET incorporated in the circuit shown in FIG. 1.

DETAILED DESCRIPTION OF THE PREFERRED EMBODIMENTS

Figure 1:
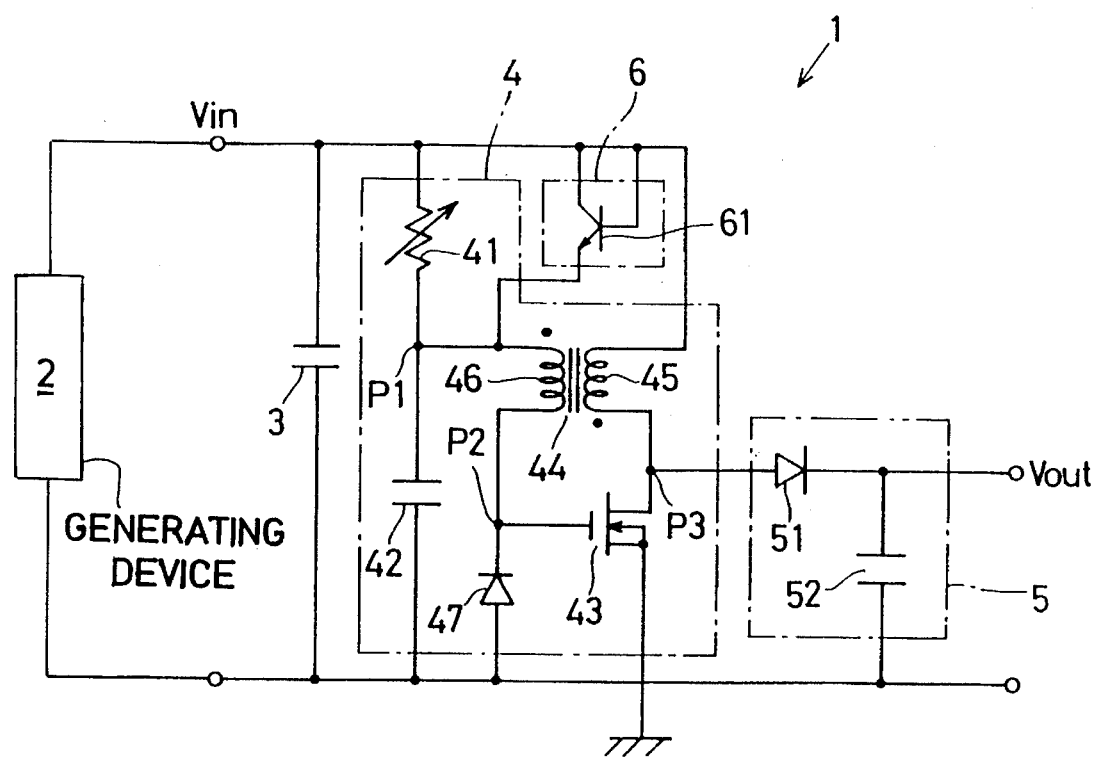
FIG. 1 is a diagram of a circuit showing the present invention in an embodiment thereof.

FIG. 1 shows the structure of a converter provided in an embodiment of the present invention. Connected to input terminals of the converter 1 is a generating device 2 such as a thermocouple adapted to produce a thermoelectromotive force. The generating device 2, which may be of any other type, will generate a weak voltage of 0.1–0.3 volts and feed an electric current of a few or several tens of mA (viz. milliamperes) to the converter 1.

The converter 1 comprises a smoothing condenser 3 interposed between an inlet line and earth, a blocking oscillator 4 connected to the output terminal of the smoothing condenser 3, and a smoothing circuit 5 similarly connected to the output end of the blocking oscillator 4.

The smoothing condenser 3 will smoothen the output from the generating device 2. The blocking oscillator 4 is composed of a resistor 41 and a condenser 42 connected one to another in series, a transformer 44, and a field-effect transistor (referred to below as 'FET') 43 of the MOS type.

The series connection of resistor 41 and condenser 42 will form a charging circuit when the converter 1 starts to operate, while functioning as a discharging circuit that releases a charge from the condenser 42 at a given time constant once the converter has been energized. A variable resistor is used as the resistor 41 in the connection thereof with the condenser 42, in order to variably set the time constant of said connection.

Figure 2A:
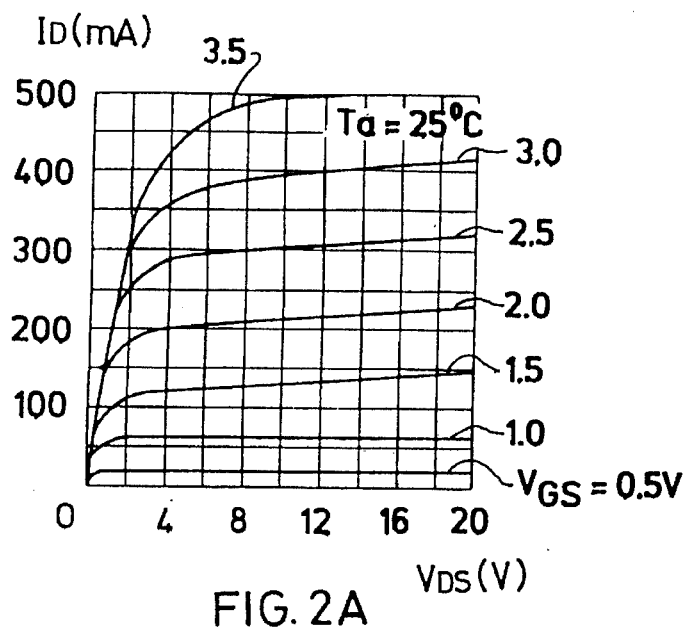
FIG. 2A is a graph showing the performance of an FET incorporated in the circuit, with respect to a drain current and a voltage charged between the FET's drain and source.
Figure 2B:
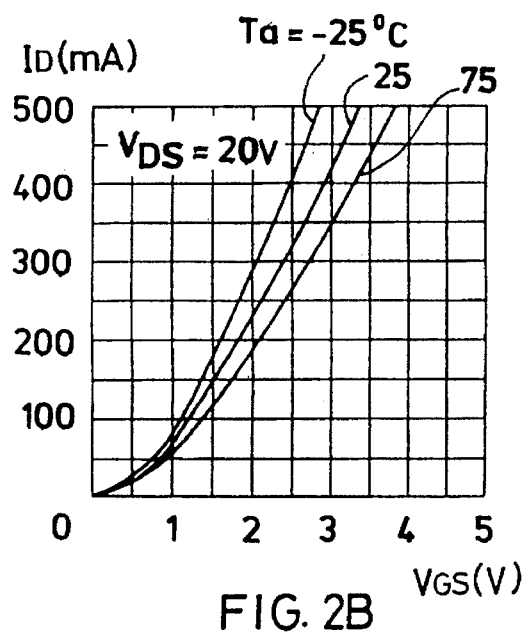
FIG. 2B is also a graph showing the performance of the FET with respect to the drain current and a voltage charged between the FET's gate and source.
Figure 2C:
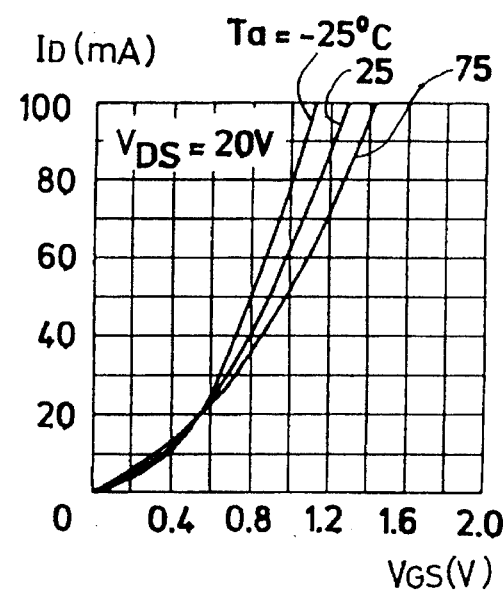
FIG. 2C is a magnified graph representing a region of the graph shown in FIG. 2B.

The FET 43 is of the enhancement type such that an electric current is not conducted when the voltage $V_{GS}$ between the gate and source is zero. A biasing voltage imparted to the gate will however make the FET active and conductive. As exemplified in FIGS. 2A to 2C, $V_{GS}$ lower than a weak input voltage $V_{in}$ from the generating device 2 must cause the FET 43 to produce a drain current. FETs of the enhancement type that can operate at such an extremely low voltage below the weak input voltage. $V_{in}$ include that which is called '2SK213'. An FET of the depression type is not feasible, because the blocking oscillator 4 will fall into an unstable state when it starts to operate. Any FET that cannot be activated with the extremely low voltage below the weak input voltage $V_{in}$ will fail to start up the blocking oscillator 4.

The source of FET 43 is earthed, with the drain thereof being connected to one end of a primary winding 45 of the transformer 44. One end of a secondary winding 46 of this transformer is connected to the gate of the transistor. The primary winding 45 has the other end connected to the input line, while the secondary winding 46 having the other end connected to a point P1 of a lead extending between and connected to the resistor 41 and condenser 42. The number of turns in the secondary winding 46 is larger than that in the primary winding 45 of the transformer 44. The direction in which the primary winding 45 is wound is such that an electromotive force is generated whose positive pole is directed to the FET's drain when FET 43 is inactive. On the other hand, the direction in which the secondary winding 46 is wound is such that an electromotive force is generated whose positive pole is directed to the condenser 42, with negative pole being directed to FET's gate when the FET is inactive. Consequently, the condenser 42 will be charged with the voltage induced through the secondary winding 46 while the FET 43 is inactive. The charge thus accumulated will then be discharged through the resistor 41 and the generating device 2, at a given time constant.

A diode 47 interposed between the earth and the gate of FET 43 has a cathode facing the gate, for the purpose of reverse bias for the FET. This reverse bias applied to between the gate and source of the FET is of an intensity equal to $V_F$ of the diode 47 so that the FET is surely inactivated.

The smoothing circuit 5, which will act to smooth the output pulses from the blocking oscillator 4 described above, is composed of a diode 51 and a smoothing condenser 52. This diode 51 has an anode connected to the drain of the FET 43, and the condenser 52 is earthed and connected to a cathode of the diode 51. An output voltage $V_{out}$ of the subject converter 1 will be taken out of the opposite poles of that condenser 52.

In this embodiment, a stabilizing circuit 6 is included in the converter 1 so that the output voltage $V_{out}$ at the terminals of the smoothing condenser 52 is stabilized. The stabilizing circuit is a clamp circuit intervening between the input line and the charging-discharging condenser 42. This clamp circuit is an 'npn' transistor 61 whose base and collector are connected to the input line, and an emitter connected to the charging-discharging condenser. The 'npn' transistor acts as a Zener element preventing the voltage between the opposite poles of condenser 42 from exceeding a given upper limit.

Operation of the converter 1 will now be described referring to FIGS. 3A to 3C which show the voltage waveform at the points P1, P2 and P3. The point P1 is located between the resistor 41 and condenser 42 connected thereto, with the other points P2 and P3 being located at the gate and drain terminals of the FET 43, respectively.

When the converter 1 is put into operation, a weak input voltage $V_{in}$ generated by the generating device 2 and appearing at an input terminal will be applied to the condenser 42 through the resistor 41. This charge will be accumulated in the condenser, at the time constant determined by the resistor's resistance and the condenser's capacity. In consequence, the voltage at P1 between the resistor 41 and the condenser 42 will gradually rise, also gradually raising the gate-source voltage charged on the FET 43. Since this FET is of the enhancement type capable of being activated with any gate-source voltage lower than the weak input voltage $V_{in}$, there will appear a conductivity between the FET' drain and source, before the voltage at P1 rises to a peak. Thus a current will flow from the input line, through the transformer's primary winding 45 and the drain towards the source of FET 43. The increasing gate-source voltage will intensify the drain current so that a voltage induce through the secondary winding 46 of the transformer 44. Positive and negative poles of the induced voltage will be directed to the FET's gate and to the point P1, respectively. As a result, the FET's gate voltage at P2 will further rise to produce a peak drain current through the FET 43.

No further increase will take place in the drain current after it has reached the peak, so that the voltage induced through the secondary winding 46 of the transformer 44 will disappear to lower the gate voltage for FET 43. In consequence, the drain current decreases so as to induce a reverse voltage through the transformer's secondary winding 46. Positive pole of this reverse voltage faces the point P1, with negative pole facing the FET's gate. Such a reverse induction of voltage across the gate will cause thereto a reverse bias corresponding to the value $V_F$ of diode. FET 43 is thus inactivated quickly to generate a pulse voltage through the primary winding 45 of transformer 44, wherein the positive pole of the pulse voltage faces the FET's drain. This pulse voltage of an intensity much higher than the input voltage $V_{in}$ will be transmitted through the diode 51 to charge the condenser 52 in the smoothing circuit 5. In response to the pulse voltage generated through the primary winding 45, a further intensive pulse voltage will be induced through secondary winding 46 of the transformer. Positive and negative poles of the further pulse voltage face the point P1 and the FET's gate, respectively. Such a further pulse voltage through said secondary winding will charge the condenser 42 in the oscillator 4 so that the voltage at P1 rises up to the peak value.

The converter 1 started up in the described manner will repeat its operation as shown in FIGS. 3A to 3C and in the following manner.

As shown in FIG. 3C, as the pulse voltage through the primary winding 45 of the transformer 44 disappears at a time T1, the other pulse voltage that has been induced through the secondary winding 46 will also disappear. This allows the intensive charge on the terminal of condenser 42 to be applied to the gate of the FET 43 so that a drain current flows therethrough. The primary winding 45 of the transformer causes the drain current not to have a peak intensity in a moment but to gradually approach it. At the same time as the disappearance of the other pulse voltage out of the secondary winding 46, the charge that has been accumulated in the condenser 42 will be unloaded through a reverse closed loop starting from the condenser 42, passing through the resistor 41 and the generating device 2 in this order and returning to the condenser.

Due to the condenser 42 discharged, both the voltages at the point P1 and the point P2 connected to the FET gate terminal will be lowered (see FIGS. 3A and 3B, respectively). As the voltage at the FET gate falls across a predetermined level, the drain current through the FET 43 will be weakened gradually so as to generate an electromotive force through the transformer secondary winding 46. This electromotive force having its positive pole directed to the junction point P1 and its negative pole to the FET gate will load a reverse bias to the FET 43 between the gate and source thereof to instantaneously inactivate this FET. Consequently, the drain current is extinguished instantaneously and simultaneously, whereby a pulse voltage much higher than the input voltage $V_{in}$ and having its positive pole converging with the FET drain will be generated through the transformer primary winding 45. This pulse voltage will be charged to the condenser 52 of the smoothing circuit 5, through the diode 51 connected to this condenser. On the other hand and in response to the pulse voltage through the primary winding 45, a similarly high pulse voltage is induced through the secondary winding 46 of the transformer 44. The latter pulse voltage having its positive pole converging with the joint point P1 and its negative pole converging with the FET gate will charge the condenser 42 again until the voltage at P1 becomes equal to the peak pulse voltage.

With the pulse voltages induced through the primary and secondary windings 45 and 46 being extinguished, the charge accumulated in the condenser 42 will be unloaded again through the closed loop reversely through the resistor 41 and the generating device 2 and returning to said condenser. Such a sequential operation as described above of the converter will be repeated to provide a series of periodical pulses through the transformer primary winding 45.

The pulse voltages thus produced will be charged repeatedly to the condenser 52 in the smoothing circuit 5. The output DC voltage $V_{out}$ obtained at the terminals of said condenser will be for example 3 volts, that is much higher than the weak input voltage $V_{in}$. The intensity of this output voltage depends on the cycle of those pulses generated in the transformer primary winding 45, wherein a longer cycle will give a lower output voltage.

The output from this converter 1 may be used to recharge batteries or to drive the control circuits or the like in various apparatuses.

The output voltage $V_{out}$ may be varied in the following manner. By reducing the resistance of the variable resistor 41, the time constant that is a function of this resistance and the capacity of the condenser 42 will be decreased. The decreased time constant shortens the time for the charge accumulated in the condenser 42 to be discharged after the inactivation of FET, as shown at the broken and phantom lines in FIGS. 3A to 3C. The FET 43 will thus be inactivated earlier in each cycle, thereby shortening the intervals at which the pulse voltage repeatedly appears through the transformer primary winding 45. In consequence, the number of output pulses per unit time increases to raise the output voltage $V_{out}$ delivered from this converter 1. If contrarily the resistance of variable resistor 41 is increased, then time constant increases to delay the timing of inactivation of FET 43 in each cycle. Intervals at which the pulses appear through the primary winding 45 will thus be lengthened to lower the output voltage. In summary, the resistance of the resistor 41 may be adjusted to obtain the output of a desired voltage $V_{out}$.

The stabilizing circuit 6 mentioned above will function as follows. An intensified drain current or the like tends to raise the converter's output voltage, that is the terminal voltage appearing at the terminals of smoothing condenser 52. As a result, the voltage induced through the secondary winding 46 tends to rise when the FET is inactivated, to thereby increase the charge applied to the condenser 42. If and when the voltage rising at the terminals of this condenser exceeds the breakdown voltage defined between the emitter and collector of the transistor 61, this transistor will yield to clamp the output terminal voltage of the condenser 42 at a constant level. Thus, the unloading of electric charge from this condenser will be stabilized, with the inactivation timing being kept constant for the FET. The voltage induced through the primary winding 45 is protected in this manner from undesirably rising, whereby the output voltage $V_{out}$ of this converter is kept constant at any desired level.

In the embodiment illustrated in FIG. 1, the clamp circuit as the stabilizing circuit 6 consists of the transistor 61. This is because such a transistor can respond sensitively even to a weak current to give the Zener effect. However, the clamp circuit may be composed in any other appropriate manner.

Also in the embodiment shown in FIG. 1, the FET 43 is of the enhancement type such that a weak gate-source voltage equal to or lower than the weak input voltage $V_{in}$ can drive the FET. If such a FET 43 is of a large capacity as is the case in a power plant, the drain-source resistance will be so high that a necessary drain current is not obtained easily during the oscillation in this case, an auxiliary FET 48 of a smaller capacity may be added to the primary one 43 in parallel therewith as shown in FIG. 4 to assist the FET 43 to produce a sufficient drain current. In detail, the added FET 48 will mainly contribute to the oscillation, after the primary one has activated the blocking oscillator 4. The auxiliary FET must also be of the enhancement type but may not necessarily be responsive to a gate-source voltage lower than the weak input voltage $V_{in}$. This is because a high voltage is held in the condenser 42.

In summary, the field-effect transistor (FET) of the enhancement type incorporated in the blocking oscillator can be energized, even if the gate-source voltage is equal to or lower than a predetermined weak DC voltage of 0.3 volts or less. The output pulses generated by the oscillator are of a raised voltage much higher than the input voltage activating the oscillator. Therefore, such a converter can be used as a power source for rechargeable batteries or used in drive circuits for various electric controllers. A low-voltage output from a single small-capacity generating device can now be amplified directly to provide a sufficiently high-voltage output, thereby making it unnecessary to form an array of such devices arranged in series or to employ a large-scaled generating device.

Also as described above, the blocking oscillator can be provided herein by composing a relatively simple circuit that comprises: the resistor and the condenser in series and between the earth and the input line; the FET having the source earthed; the transformer whose secondary winding is connected to and disposed between the FET's gate and the line connecting the resistor to the condenser, with the primary winding of the transformer being connected to the input line and the FET's drain; and the diode connected to and interposed between the earth and the FET's gate facing the diode's cathode, so that an electromotive force is induced through the secondary winding when the transistor is in a cutoff state, wherein the positive side of the electromotive force is directed to the condenser, with the negative side being directed to the FET's gate.

In one preferable case wherein the converter has the means for adjusting the time constant for the resistor and condenser, the frequency of the output pulses emitted from the transformer primary winding, that is the output voltage obtained from this converter, can be selected voluntarily by adjusting said time constant.

In the further preferable case wherein the smoothing circuit is connected to the output terminals of blocking oscillator, the output pulses from the transformer primary winding will be smoothed to give a stable DC voltage of a lower ripple percentage.

In the still further case wherein the stabilizing circuit is employed to stabilize the output from the smoothing circuit, the time constant of the resistor and condenser will be regulated automatically to maintain constant the frequency of output pulses, that is the output voltage, obtained from the primary winding of the transformer.

What is claimed is:

1. A converter for raising a weak input DC voltage ($V_{in}$) of 0.3 volts or less by generating output pulses of an output voltage much higher than the weak input DC voltage ($V_{in}$) that is supplied through an input line, the converter comprising a blocking oscillator (4) composed of:

a primary field-effect transistor (43), of the enhancement type capable of being activated by a gate-source voltage of 0.3 volts or less so as to generate an initial electromotive force;

an auxiliary field-effect transistor (48) also of the enhancement type, connected in parallel to the primary field-effect transistor (43) and capable of being activated in response to another gate-source voltage higher than 0.5 volts; and a transformer (44) having a primary winding (45) disposed in a drain current line that is connected to the input line and formed through both the field-effect transistors (43,48), and a secondary winding (46) disposed in and connected to a closed loop formed through gates and sources of said transistors (43,48), whereby the weak input DC voltage ($V_{in}$) initially activates the primary transistor (43) to induce a raised voltage in the secondary winding (46), and subsequently the raised voltage drives the auxiliary transistor (48) to continuously produce a drain current of such an intensity as to maintain the raised voltage in said secondary winding (46), which in turn causes the primary winding (45) of the transformer (44) to continuously generate the output pulses.

2. A converter for raising a weak input DC voltage ($V_{in}$) of 0.3 volts or less by generating output pulses of an output voltage much higher than the weak input DC voltage ($V_{in}$) that is supplied through an input line, the converter comprising a blocking oscillator (4) composed of:

a primary field-effect transistor (43) of the enhancement type is capable of being activated by the weak input DC voltage ($V_{in}$) charged between a gate and a source of said transistor (43);

a resistor (41) and a condenser (42) connected in series one to another through a conductive line and between an earth and an input line;

the field-effect transistor (43) having the source earthed;

a transformer (44) whose secondary winding (46) is connected to and disposed between the gate and the conductive line, with a primary winding (45) of the transformer being connected to the input line and the drain of the field-effect transistor (43); and a diode (47) connected to and interposed between the earth and the gate of the field-effect transistor (43), with a cathode of the diode (47) being directed to said gate, so that an electromotive force is induced through the secondary winding (46) when the transistor is in a cutoff state, wherein the positive side of the electromotive force is directed to the condenser (42), with the negative side of said electromotive force being directed to the gate of the field-effect transistor (43).

3. A converter as defined in claim 1, wherein the weak input DC voltage ($V_{in}$) is generated by a generating device included in a solar battery.

4. A converter as defined in claim 2, wherein the weak input DC voltage ($V_{in}$) is generated by a generating device included in a solar battery.

5. A converter as defined in claim 1, wherein the weak input DC voltage ($V_{in}$) is generated by a generating device included in a thermal battery so as to be heated to generate an electromotive force.

6. A converter as defined in claim 4, wherein the weak input DC voltage ($V_{in}$) is generated by a generating device included in a thermal battery so as to be headed to generate an electromotive force.

7. A converter as defined in claim 2, further comprising a means for variably setting a time constant for the resistor (41) and the condenser (42).

8. A converter as defined in claim 1, further comprising a smoothing circuit (5) connected to output terminals of the blocking oscillator (4).

9. A converter as defined in claim 2, further comprising a smoothing circuit (5) connected to output terminals of the blocking oscillator (4).

10. A converter as defined in claim 7, further comprising a stabilizing circuit (6) for automatically regulating the time constant for the resistor (41) and the condenser (42) so as to stabilize an output from the smoothing circuit (5).

11. A converter as defined in claim 2, further comprising an auxiliary field-effect transistor (48) connected to the primary field-effect transistor (43) in parallel therewith and is capable of being activated by a gate-source voltage higher than 0.3 volts so as to ensure a drain current.

12. A converter for raising a weak input DC voltage ($V_{in}$) of 0.3 volts or less to an output voltage, the converter comprising:

a blocking oscillator (4);

a primary field-effect transistor (43) having a gate, a source and a drain and incorporated in the blocking oscillator (4), wherein the field-effect transistor (43) is of the enhancement type capable of being activated by a gate-source voltage equal to or less than the weak input DC voltage ($V_{in}$), and the blocking oscillator (4) is activated to oscillate in response to the gate-source voltage charged between the gate and the source of the field-effect transistor, so that output pulses are generated to provide the output voltage much higher than the weak input DC voltage ($V_{in}$), the blocking oscillator (4) being composed of:

a resistor (41) and a condenser (42) connected in series one to another through a line and between an earth and an input line for supplying the weak input DC voltage ($V_{in}$);

the field-effect transistor (43) having the source earthed;

a transformer (44) whose secondary winding (46) is connected to and disposed between the gate and the line connecting the resistor to the condenser, with a primary winding (45) of the transformer being connected to the input line and the drain of the field-effect transistor (43);

a diode (47) connected to and interposed between the earth and the gate of the field-effect transistor (43), with a cathode of the diode (47) being directed to said gate, so that an electromotive force is induced through the secondary winding (46) when the transistor is in a cutoff state, wherein the positive side of the electromotive force is directed to the condenser (42), with the negative side of said electromotive force being directed to the gate of the field-effect transistor (43), the converter further comprising:

a smoothing circuit (5) connected to output terminals of the blocking oscillator (4); and a stabilizing circuit (6) for automatically regulating the time constant for the resistor (41) and the condenser (42) so as to stabilize an output from the smoothing circuit (5).

13. A converter as defined in claim 12, further comprising an auxiliary field-effect transistor (48) connected to the primary field-effect transistor (43) in parallel therewith and is capable of being activated by a gate-source voltage higher than 0.3 volts so as to ensure a drain current.

* * * * *